United States Patent Office 3,293,175
Patented Dec. 20, 1966

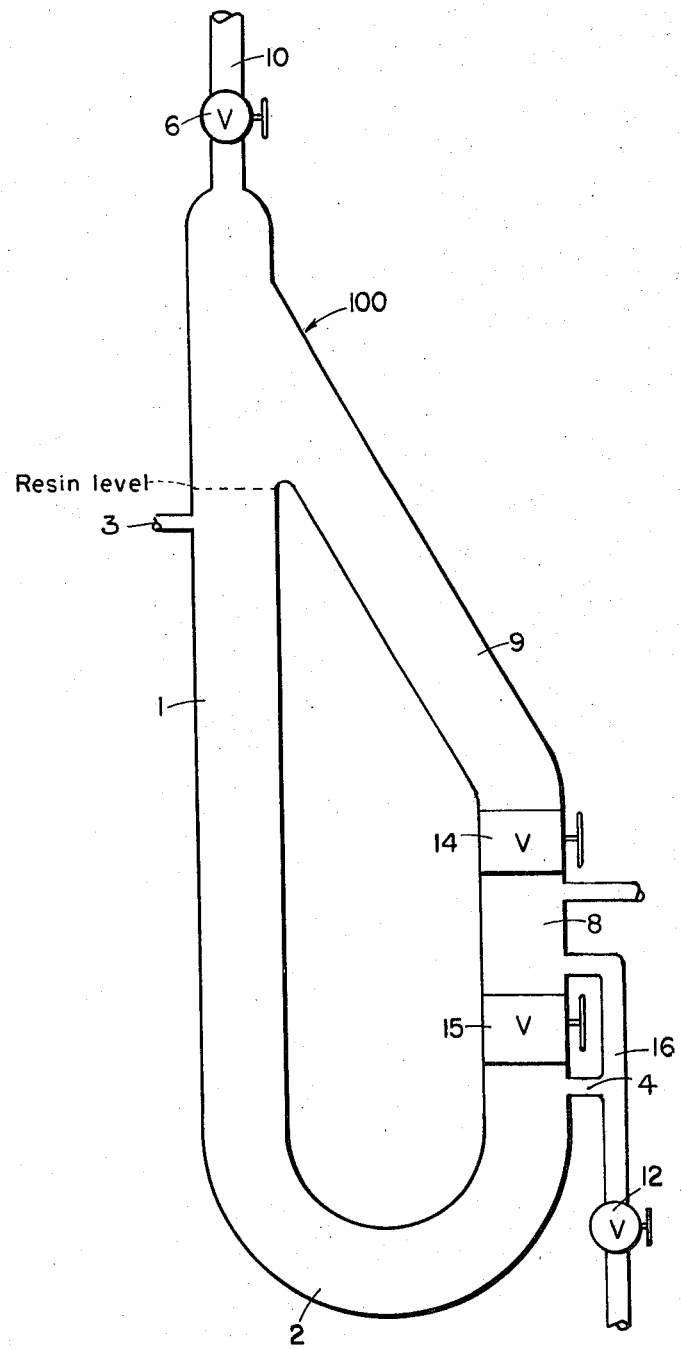

3,293,175
ION EXCHANGE PROCESSES
Karel Popper, Modesto, Calif. (166 Hazel Drive, Pleasant Hill, Calif. 94523) and Vladimir Slamecka, Chevy Chase, Md. (Georgia Institute of Technology, Atlanta, Ga. 30332)
Filed Feb. 19, 1963, Ser. No. 259,542
4 Claims. (Cl. 210—32)

This invention generally relates to ion exchange processes and is particularly concerned with a procedure for regenerating a bed of ion exchange material with a sparingly soluble compound located within the confines of the column.

The mechanism of ion exchange is capable of solubilizing normally insoluble or sparingly soluble compounds. Thus, even compounds of such negligible solubilities as barium sulfate or calcium carbonate are dissolved in ion exchange resin systems. The solubilizing activity of the respective exchange resins is greatly increased if both the cation and the anion exchange resin are simultaneously present.

It is a primary object of this invention to provide an ion exchange cycle wherein sparingly soluble alkaline earth metal compounds formed during a stage of the cycle are retained within the confines of the exchange column and are utilized for regenerating the cation and anion exchange material in the column at a subsequent stage of the cycle.

Generally it is an object of this invention to improve on regeneration procedures for ion exchange processes.

According to this invention, a mixed bed of cation and anion exchange resins is originally brought into a state of regeneration so that subsequent elution with a liquid containing polar constituents will result in a sparingly soluble or insoluble compound. Thus, for example, if a bed of cation and anion exchange resins is first contacted with, for example, an aqueous calcium hydroxide solution, the cation exchange resin will be brought in the calcium form while the anion exchange resin will be in the OH form. If the resin bed is then eluted with, for example, sea water containing sodium chloride, the sodium chloride in the sea water is exchanged for calcium hydroxide. As calcium hydroxide is but sparingly soluble in water, a precipitate of calcium hydroxide is formed. Pursuant to this invention, the column is constructed in such a manner that the precipitate of the calcium hydroxide is retained within the confines of the column. When the column, which is now in the sodium and chloride form is exhausted, regeneration is effected by flushing the calcium hydroxide precipitate through the column, whereby regeneration of the column into the calcium and hydroxide form, respectively, takes place.

It will be realized that there are many possible states of regeneration and many compounds which are suitable for attaining the desired result.

From a practical point of view, alkaline earth metal hydroxides, carbonates and sulfates are of primary importance, although alkaline earth metal sulfides as well as other metallic hydroxides and salts can be successfully employed for the inventive purpose. The particular choice of the respective regenerant material will be made in accordance with the ionic species to be removed from the liquid to be treated and in accordance with the characteristics of the liquid itself.

Without being limited thereto, the invention will be described in detail in relation to the demineralization of sea water, for which purpose calcium hydroxide and calcium carbonate are most important, as they are the most readily available regenerants.

The reaction which takes place in the system may be represented by the following formula:

$$(RSO_3)_2Ca + 2NaCl \rightarrow 2RSO_3Na + CaCl_2$$
$$2RN(CH_3)_3OH + CaCl_2 \rightarrow 2RN(CH_3)_3Cl + Ca(OH)_2$$

wherein R represents the resin matrix and $SO_3$ and $N(CH_3)_3$ represent the sulfonic and quaternary ammonia active groups of the ion exchange resin, respectively.

As will be noted, the product of the ion exchange of a sodium chloride-containing liquid is, in this instance, calcium hydroxide. The solubility of calcium hydroxide in water at ordinary temperatures such as 20° C. is relatively low, i.e., about 0.16 to 0.17%, so that solid $Ca(OH)_2$ precipitates.

If the cation exchange material is in the magnesium instead of the calcium form, the product obtained upon exchange with sodium chloride solutions exhibits a still lower solubility, as magnesium hydroxide is practically insoluble in water. The same holds true if the anion exchanger is in the carbonate instead of the OH form. The use of sulfate or sulfide as anions also yields products of extremely low solubility.

In practice, a column is packed with a mixed bed of cation and anion exchange resins. The proportion between the cation and anion exchange resin should be calculated in relation to the relative affinities of the ion to be removed from the solution to be treated and the ions held on the respective resins so as to obtain an equimolar mixture in a desired ratio for the removal of polar impurities.

After the polar impurities have been removed from the solution to be treated and the sparingly soluble compound has thus been formed as a precipitate retained in the column, the mixed bed in the column is regenerated by flushing water through the column, whereby the sparingly soluble precipitate is dispersed and dissolves in the intersticial spaces of the resin bed to replace and remove the cations and anions then held by the resins.

Particularly advantageous results are obtained if a regenerant material is chosen which exhibits a considerably stronger affinity for the resin than the ions which are to be removed from the solution to be treated. In this manner, an equilibrium favorable to the regeneration step is obtained.

The invention will now be described by several examples, it being understood, however, that these examples are given by way of illustration and not by way of limitation and that many changes may be effected without affecting in any way the spirit and scope of this invention as recited in the appended claims.

*Example 1*

This experiment was carried out in a Lucite column, 5 feet tall and having an inside diameter of 1 inch. The column was provided with stainless steel fittings of needle valves and had vents on both ends. The fittings included Dacron filters. The useful volume of the column was 740 milliliters. The column was packed with a mixture of cation exchange resin and anion exchange resin. The cation exchange resin consisted of 471 milliliters of a sulfonic polystyrene cross-linked with divinyl benzene. This resin is known in the trade under the name "Duolite C–20." The anion exchanger consisted of 269 milliliters of trialkylalkanoammonium polystyrene known in the trade as "Duolite A–102D."

The column was brought in the calcium and OH form by passing therethrough a saturated aqueous solution of calcium hydroxide (water of lime). The water of lime solution was passed through the column until the input composition was equal to the effluent composition.

The test material was water taken at the Sausalito shore of the San Francisco Bay. The bay water had a total alkali metal content of 3.01%, calculated as NaCl, the real sodium chloride content being 2.8%. The water was passed through the column down-flow. The clear effluent emanating from the column was passed through a continuous sampler fitted with an alkali metal sensitive electrode manufactured by the Beckman Scientific Instruments Company and the run was continued until a reading of alkali metal expressed as sodium chloride reached 0.5%. A precipitate of calcium hydroxide formed within the confines of the column and was retained therein.

The run was discontinued when the total volume of the effluent water was 950 mm. The water was essentially salt free and had a calcium hydroxide content of 0.16%.

The column was then inverted and a saturated water of lime (calcium hydroxide) solution was run down-flow. The first 300 cubic centimeters of the effluent emanating from the column contained more than 3.5% of sodium chloride. As the amount of calcium hydroxide contained in the water of lime could not possibly cause the substitution of an amount of sodium chloride corresponding to 3.5%, it was conclusively established that the calcium hydroxide dispresed within the column participated in the regeneration of the resins.

Example II

The procedure of Example I was repeated. However, the regeneration of the column was effected by passing the water of lime up-flow instead of down-flow. No inversion of the column was effected. As in Example I, the effluent contained more sodium chloride than the input material of the desalting run.

Example III

The procedure of Example I was repeated. Regeneration of the column after the ion exchange with the sea water was, however, effected with boiled, distilled water. Boiling of the water prior to passing it through the column was effected for the purpose of removing carbon dioxide which otherwise would tend to interfere with the solubility of the lime within the column. The regenerant effluent contained 3.34% of sodium chloride which was substantially higher than the amount of sodium chloride in the sea water originally passed through the column. However, it will be noted that the amount of sodium chloride in the effluent is lower than that obtained in Examples I and II as the regenerating liquid did not contain any dissolved calcium hydroxide but the regeneration was exclusively accomplished by the calcium hydroxide present within the confines of the column. This conclusively establishes that the regeneration of the resin material is caused by the precipitate within the column system.

Example IV

This experiment was carried out in a column packed with equal amounts of cation and anion exchange resins. The cation resin was a sulfonated polystyrene resin in the potassium form and the anion exchanger was a type II polystyrene quaternary ammonia resin in the chloride form. The resin bed was regenerated by passing through it a sufficient amount of a saturated aqueous solution of calcium sulfate until the composition of the liquid effluent exiting from the bottom of the column was equal to the composition of the liquid entering the column on the top. In other words, calcium sulfate solution was passed through the column until the effluent contained the same amount of calcium sulfate as the input solution.

The solution was then exhausted by passage of molasses. The molasses was diluted to 12° Brix and had previously been passed through a mixed bed of cation and anion resin in the sodium and Cl- form, respectively, so that the polar impurities of the molasses essentially consisted of sodium chloride.

Upon passage of the diluted molasses through the column, an effluent liquid containing 0.2% of calcium sulfate was obtained. A calcium sulfate precipitate formed within the column and lodged itself there within the interstices of the resin. The column was then inverted and regenerated by passage of water. The calcium sulfate within the column thus caused the regeneration. The concentration of sodium in the effluent during regeneration reached for a short period the value of 8000 p.p.m.

Example V

The same column as used in Example IV was regenerated by the passage of a solution of calcium bicarbonate. The column was thereafter exhausted with sea water. The sea water had an original salt content of 3.45%. The effluent sea water, upon passage through the column, contained 0.17% of calcium bicarbonate. The effluent was then heated to boiling and the precipitate formed was filtered off. Extremely pure water was obtained.

The column was then inverted and regenerated by passage of water. The calcium bicarbonate within the column efficiently regenerated the column. The regeneration with the water-calcium bicarbonate did not result in any appreciable losses, since only 1.27 grams of calcium bicarbonate had been dissolved in the effluent sea water while about 84 grams of solid bicarbonate had remained within the column. This small loss of regenerant can be easily made up by regeneration with a saturated solution of bicarbonate instead of pure water.

Example VI

The ion exchange processes of Examples I–V may advantageously be carried out in a continuous type contactor as illustrated in the single drawing accompanying this application.

The contactor generally referred to by reference numeral 100 comprises a vertically extending column portion 1 having a U-shaped lower leg portion 2. The inlet of the column is indicated by 3 while the discharge bears reference numeral 4. The top of the column leads to a valve controlled vacuum source generally indicated by reference numeral 10, the valve bearing numeral 6. The column system also comprises a regeneration chamber 8 and a slanted leg portion 9 extending from the top of the column downwardly to the regeneration chamber. Flow through the discharge line 4 is controlled by valve 12. Reference numerals 14 and 15 indicate valves at the upper and lower extremities of the regeneration chamber 8. The regeneration chamber is connected to discharge 4 by line 16.

The column of the figure, as previously mentioned, may be used for carrying out the processes described in Examples I–V.

A further test will be described in the following:

The column was packed with a resin mixture of the same composition as described in Example I and was brought into the calcium and hydroxide form, respectively. Sea water was then introduced through inlet 3 and discharged through exit 4. A portion of the purified sea water was introduced into the regeneration chamber 8 through line 16. A pressure drop across the resin bed was observed after a period of time. This signified that an appreciable amount of calcium hydroxide precipitate had been formed within the column to cause flow impediment. Valve 6 leading to the vacuum source 10 was then opened so that the resin was moved upwardly while air was drawn into the system through valve 12. Valve 15 was then opened and the resin in the regeneration chamber was thus allowed to fall into the place vacated by the resin drawn upwardly into the top of the column 1. The vacuum was then interrupted by closing valve 6, valve 15 was closed and valve 14 was opened. This caused the resin, which was present in the slanted leg 9, to move into the regeneration chamber 8 and the exhausted resin mixture on top of the column, together with precipitated calcium hydroxide, moved in turn into the space defined by the slanted leg. Operation was thereafter resumed until the resin in the entire column was substantially exhausted and brought into the sodium chloride form. Thereafter, water was introduced through inlet 3 which caused regeneration due to the presence of the calcium hydroxide in the column.

While the input concentration of sodium chloride in the sea water was 3.5% as determined by a salometer, a 6.5 percentage of sodium chloride was found in the regeneration effluent exiting through exit 4. It is thus evident that the regeneration is caused by means of the calcium hydroxide deposited within the interstices of the resin mixture.

It will be realized that a large number of commercially available resins may be used for the inventive purpose. As example, the following resins may be mentioned: Duolite cation exchangers, manufactured by Diamond Alkali, Western Division, known in the trade under names "Duolite C–3, C–10, C–20 and C–25"; and, Duolite anion exchambers, known in the trade as "Duolite A–30, A–40, A–42, A–101 and A–102."

While specific embodiments of the invention have been shown and described in detail to illustrate the application of the principles of the invention, it will be understood that the invention may be embodied otherwise without departing from such principles.

What is claimed is:

1. In an ion exchange cycle carried out with a bed of anion and cation exchange material located in a column having valve controlled exit means, wherein during one stage of the cycle a sparingly soluble alkaline earth metal compound is formed, the improvement which comprises regenerating said bed of anion and cation exchange material by retaining said sparingly soluble alkaline earth metal compound within the confines of the column, and flushing said compound through said column with water while the valve of the exit means is closed to cause the cations and the anions of said compound to regenerate the active sites of said anion and cation exchange material, respectively.

2. The improvement of claim 1, wherein said compound is selected from the group consisting of calcium hydroxide, calcium carbonate, calcium sulfate, calcium bicarbonate, magnesium hydroxide, magnesium carbonate, magnesium sulfate and magnesium bicarbonate.

3. An ion exchange cycle for removing polar impurities from a liquid selected from the group consisting of salt water and sugar juice, which comprises
 (a) regenerating a bed of cation exchange material and anion exchange material located in a column having valve controlled exit means with an alkaline earth metal ion and an anion, respectively, said alkaline earth metal ion and said anion being capable of forming a sparingly soluble compound,
 (b) passing said polar impurities-containing liquid through said regenerated bed thereby to exchange the cations and the anions of said bed for the cations and anions of said liquid and to form a precipitate of a sparingly soluble component of said cations and anions,
 (c) retaining said precipitate within the confines of said column, and
 (d) regenerating said bed by flushing water through said column while the valve of the exit means is close to cause the cations and anions of said precipitate to exchange the cations and anions at the active sites of the cation and anion material, respectively.

4. An ion exchange cycle for desalting sea water, which comprises passing the sea water through a column of cation exchanger in the calcium form and anion exchanger in the OH form, whereby the polar impurities of the sea water are exchanged for calcium hydroxide and an effluent substantially saturated with calcium hydroxide and a calcium hydroxide precipitate is formed, said column having valve controlled exit means, retaining the calcium hydroxide precipitate within the confines of the column, and regenerating the column by passing water therethrough while the valve of the exit means is closed whereby the retained calcium hydroxide regenerates said cation and anion exchanger.

References Cited by the Examiner
UNITED STATES PATENTS

| | | | |
|---|---|---|---|
| 2,660,558 | 11/1953 | Tuda | 210—34 |
| 2,884,310 | 4/1959 | Rosenberg et al. | 23—184 |
| 3,073,725 | 1/1963 | Popper | 127—46 |

MORRIS O. WOLK, *Primary Examiner.*

JOSEPH SCOVRONEK, *Examiner.*

E. G. WHITBY, *Assistant Examiner.*